(12) United States Patent
Yamamoto et al.

(10) Patent No.: US 6,184,312 B1
(45) Date of Patent: *Feb. 6, 2001

(54) FLAME RETARDANT RESIN COMPOSITIONS

(75) Inventors: Kenji Yamamoto; Masaaki Yamaya; Akira Yamamoto; Yoshiteru Kobayashi, all of Usui-gun (JP)

(73) Assignee: Shin-Etsu Chemical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/193,851

(22) Filed: Nov. 18, 1998

(30) Foreign Application Priority Data

Nov. 19, 1997 (JP) ...................................................... 9-335153

(51) Int. Cl.$^7$ ............................ C08G 77/06; C08L 71/02; C08L 63/00; C08L 83/04
(52) U.S. Cl. ........................... 525/474; 525/476; 525/481; 525/393; 525/396; 525/464; 524/262; 524/263; 523/400; 523/403; 523/427; 528/43
(58) Field of Search ....................................... 525/474, 476, 525/481, 393, 396, 464; 524/262, 263; 523/400, 403, 427; 528/43

(56) References Cited

U.S. PATENT DOCUMENTS

| 4,197,384 |   | 4/1980  | Bialous et al. |         |
|-----------|---|---------|----------------|---------|
| 4,265,801 |   | 5/1981  | Moody et al.   |         |
| 5,110,890 | * | 5/1992  | Butler         | 528/12  |
| 5,153,251 | * | 10/1992 | Lupinski et al.| 524/265 |
| 5,169,887 | * | 12/1992 | Snow et al.    | 524/265 |
| 5,449,710 | * | 9/1995  | Umeda et al.   | 524/265 |
| 5,693,697 | * | 12/1997 | Weider et al.  | 524/263 |

FOREIGN PATENT DOCUMENTS 415070   7/1990   (EP) .

* cited by examiner

Primary Examiner—James J. Seidleck
Assistant Examiner—Olga Asinovsky
(74) Attorney, Agent, or Firm—Millen, White, Zelano, & Branigan, P.C.

(57) ABSTRACT

A resin composition comprising (A) an aromatic polycarbonate resin or aromatic epoxy resin and (B) a minor amount of an organosiloxane containing phenyl and alkoxy radicals is flame retardant and does not emit harmful gases when burned. It can be molded into parts having optical transparency.

24 Claims, No Drawings

FLAME RETARDANT RESIN COMPOSITIONS

BACKGROUND OF THE INVENTION

1. Field of the Invention

This invention relates to flame retardant resin compositions based on synthetic resins containing an aromatic ring in a molecule such as aromatic polycarbonate resins and aromatic epoxy resins.

2. Prior Art

Flame retardant resin compositions are often used in various products such as electric and electronic parts, building members, automotive parts, and daily goods. These resin compositions are generally made flame retardant by adding organic halogen compounds optionally in admixture with antimony trioxide. However, these flame retardant resin compositions have the drawback that harmful halogen gases evolve upon combustion.

It is also known that resin compositions can be made flame retardant by adding silicone resins which do not evolve harmful gases.

JP-A 36365/1979 discloses a flame retardant resin composition wherein a silicon resin containing at least 80% by weight of trifunctional siloxane units is added to an organic resin. With respect to the organic resin, no reference is made to aromatic polycarbonate resins and aromatic epoxy resins. With a focus on the melt processing of the organic resin, a relatively high molecular weight silicone resin substantially free of crosslinking functional radicals and having a softening point above room temperature is selected. On account of a relatively weak flame retardant effect, the silicone resin must be added in a large amount of about 10 to 300 parts by weight per 100 parts by weight of the organic resin, detracting from the properties of the organic resin.

JP-A 500780/1983, 226159/1992, and 33971/1995 disclose flame retardant resin compositions having added thereto silicone resins consisting of monofunctional siloxane units and tetrafunctional siloxane units. JP-A 128434/1994 discloses a flame retardant resin composition having added thereto a silicone resin containing vinyl-bearing siloxane units. In order to exert satisfactory flame retardant effect, all these compositions, however, require to increase the amount of silicone resin added or to additionally use inorganic fillers such as aluminum hydroxide, halogens or phosphorus compounds.

In most systems with silicone resins added, the amount of silicone resin added must be increased in order to achieve satisfactory flame retardant effect, but at the sacrifice of the moldability and mechanical strength of resin compositions. Efforts have been made on silicone resin additives having greater flame retardant effect or additives capable of cooperating with silicone resins to improve the flame retardant effect.

JP-A 176425/1996 discloses a flame retardant resin composition comprising a polycarbonate resin, an epoxy-bearing organopolysiloxane, and an alkali metal salt of an organic sulfonic acid. JP-A 176427/1996 discloses a flame retardant resin composition comprising a polycarbonate resin, a polycarbonate resin modified with a phenolic hydroxyl-bearing organopolysiloxane, and an organic alkali metal salt. Further, JP-A 169914/1997 discloses a composition wherein a petroleum heavy oil or pitch is combined with a silicone compound for improving flame retardance. These silicone resins having special organic functional radicals are expensive because of the complication of their preparation process, but do not achieve a sufficient flame retardant effect to compensate for the increased cost. In this regard, a further improvement is desired.

Also for improving the thermal oxidation resistance of polycarbonate resins, it is known effective to add a silicone resin having alkoxy functional radicals which can be introduced at a relative low cost. JP-A 102352/1979 discloses a thermoplastic resin composition having added thereto a silicone resin containing alkoxy radicals as shown below.

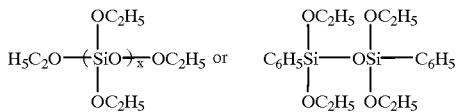

x is an integer of 2 to 10.

In general, siloxanes having a greater alkoxy content tend to form a network and provide a greater thermal oxidation resistance. The former silicone resin provides insufficient flame retardance because of the lack of phenyl radicals. The latter phenyl-bearing, low molecular weight organosiloxane is also insufficient in flame retardance because of a substantial loss of effective components through gasification by heat during melt processing or combustion.

JP-A 306265/1994 discloses a flame retardant polycarbonate resin composition comprising an aromatic polycarbonate, an alkali or alkaline earth metal salt of perfluoroalkanesulfonic acid, and an organic siloxane resin having alkoxy, phenyl and vinyl radicals introduced therein. The organic siloxane resins used in practice are insufficiently flame retardant because of a low proportion of phenyl among organic substituents. Allegedly, flame retardance is difficult to achieve unless the alkali or alkaline earth metal salt of perfluoroalkanesulfonic acid is blended.

SUMMARY OF THE INVENTION

An object of the invention is to provide a flame retardant resin composition having added thereto an organosiloxane free of the special crosslinking organic functional radicals mentioned above, which does not evolve harmful gases when burned by a fire or incinerated for disposal and is thus safe and imposes a little burden to the environment.

Another object of the invention is to provide a low-cost flame retardant resin composition wherein an organosiloxane of specific structure is selected from inexpensive organosiloxanes having alkoxy radicals as functional radicals, so as to achieve sufficient flame retardant effect even when added in minor amounts.

A further object of the invention is to provide a flame retardant resin composition wherein an alkoxy-bearing organosiloxane of specific structure is used so that the moldability of the resin composition and the outer appearance, optical transparency and physical properties (mechanical strength) of molded parts thereof are little affected.

The invention provides a flame retardant resin composition comprising (A) a synthetic resin containing an aromatic ring in a molecule, typically an aromatic polycarbonate resin or aromatic epoxy resin, and (B) a minor amount of an organosiloxane containing phenyl and alkoxy radicals, represented by the following average compositional formula (1):

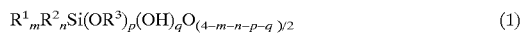

wherein $R^1$ is phenyl, $R^2$ is a monovalent hydrocarbon radical of 1 to 6 carbon atoms excluding phenyl, $R^3$ is a monovalent hydrocarbon radical of 1 to 4 carbon atoms, and letters m, n, p and q are numbers satisfying 0.5≦m≦2.0, 0≦n≦0.9, 0.42≦p≦2.5, 0≦q≦0.35, and 0.92≦m+n+p+q≦2.8. Specifically, 0.1 to 10 parts by weight of the organosiloxane of formula (1) is blended per 100 parts by weight of the synthetic resin.

The addition of the specific organosiloxane imparts flame retardance and drip inhibition and insures optical transparency to the resin composition. Since high flame retardance is achieved without adding halogens, phosphorus and antimony, the composition does not evolve harmful gases when burned. Since a minor amount of the specific organosiloxane can impart flame retardance effect, the properties inherent to aromatic ring-bearing synthetic resins such as aromatic polycarbonate resins and aromatic epoxy resins are not exacerbated.

DETAILED DESCRIPTION OF THE INVENTION

Component (A) of the resin composition according to the invention is a synthetic resin containing an aromatic ring in a molecule. Resins prepared from aromatic compounds such as phenol, styrene, and phthalic acid are included. Typically, polystyrene resins, polycarbonate resins, polyphenylene oxide resins, acrylonitrile-butadiene-styrene resins, acrylonitrile-styrene resins, aromatic epoxy resins, and aromatic polyester resins are used, with the aromatic polycarbonate resins and aromatic epoxy resins being preferred.

The aromatic polycarbonate resins may be prepared by reacting a dihydric phenol with phosgene or carbonate diester. The dihydric phenol is preferably selected from bisphenols such as 2,2-bis(4-hydroxyphenyl)propane. It is acceptable to partially or entirely replace 2,2-bis(4-hydroxyphenyl)propane by another dihydric phenol. The dihydric phenols other than 2,2-bis(4-hydroxyphenyl) propane include, for example, hydroquinone, 4,4-dihydroxyphenyl, bis(4-hydroxyphenyl)sulfide, bis(4-hydroxyphenyl)sulfone, and bis(4-hydroxyphenyl)ketone. There may be used homopolymers of these dihydric phenols alone or copolymers of two or more of these dihydric phenols or blends thereof.

The aromatic epoxy resins are synthetic resins having at least two epoxy radicals in a molecule which can be cured with various curing agents. Prior art well-known epoxy resins are useful. Examples include novolak type epoxy resins, triphenolalkane type epoxy resins, dicyclopentadiene-phenol novolak resins, phenolaralkyl type epoxy resins, glycidyl ester type epoxy resins, alicyclic epoxy resins, and heterocyclic epoxy resins. Epoxy resins with a biphenyl skeleton having a low melt viscosity are preferred, and they are combined with other epoxy resins if desired.

Component (B) is an organosiloxane of the average compositional formula (1).

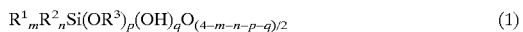

$$R^1_m R^2_n Si(OR^3)_p(OH)_q O_{(4-m-n-p-q)/2} \quad (1)$$

In formula (1), $R^1$ is phenyl, $R^2$ is a monovalent hydrocarbon radical of 1 to 6 carbon atoms excluding phenyl, $R^3$ is a monovalent hydrocarbon radical of 1 to 4 carbon atoms, and letters m, n, p and q are numbers satisfying 0.5 5≦m≦5 2.0, 0≦n≦0.9, 0.42≦p≦2.5, 0≦q≦0.35, and 0.92≦m+n+p+q≦2.8.

$R^2$ is selected from monovalent hydrocarbon radicals of 1 to 6 carbon atoms excluding phenyl, preferably alkyl radicals of 1 to 6 carbon atoms and alkenyl radicals of 2 to 6 carbon atoms. Examples include alkyl radicals such as methyl, ethyl, propyl, butyl and hexyl, and alkenyl radicals such as vinyl, propenyl and butenyl. Methyl is especially preferable from the mitigated steric hindrance and industrial standpoints.

$R^3$ is preferably selected from alkyl radicals of 1 to 4 carbon atoms, for example, methyl, ethyl, propyl, and butyl. Alkyl radicals of more than 4 carbon atoms are excluded because corresponding alkoxy radicals are less reactive so that little flame retardant effect is expectable. As the alkoxy radicals in the organosiloxane, methoxy, ethoxy and propoxy radicals are preferable.

Although the organosiloxane containing phenyl and alkoxy radicals as component (B) does not possess crosslinking organic functional radicals other than alkenyl radicals which can be optionally contained, it can impart flame retardance with a minor amount of up to 10% by weight of the entire composition. When the composition is combusted, alkoxy radicals undergo oxidative destruction/crosslinking to couple the organosiloxane with the aromatic ring-bearing synthetic resin, which is fixed near the combusted site. Additionally, phenyl radicals contained in the organosiloxane at a high content form an incombustible Si—C ceramic layer with the aromatic ring-bearing synthetic resin through mutual coupling of respective aromatic rings, exerting an enhanced flame retardant effect.

In order for this flame retarding mechanism to work effectively, the content of alkoxy radicals represented by p in average compositional formula (1), that is, the moles of alkoxy radicals per mole of silicon atoms, must be from 0.42 to 2.5. With p<0.42, less crosslinking occurs, failing in fixation near the combusted site. With p>2.5, only organosiloxanes with a low molecular weight are obtained and most of them are lost through gasification with heat during combustion before they are fixed. In either case, the flame retardant effect is reduced. An appropriate alkoxy content is 0.45 to 2.3 moles per mole of silicon atoms.

On the other hand, silanol radicals contained in the organosiloxane are less reactive and contribute little to flame retardance. The value of q in average compositional formula (1), representing the content of silanol radicals, is up to 0.35, preferably up to 0.30, when the storage stability and the stability during melt processing with the aromatic ring-bearing synthetic resin are taken into account.

Another factor necessary for the above flame retarding mechanism to work effectively is the content of phenyl radicals $R^1$. The content of phenyl radicals represented by m in average compositional formula (1), that is, the moles of phenyl radicals per mole of silicon atoms, must be from 0.5 to 2.0. With m<0.5 indicating too less phenyl radicals, no flame retardant effect is accomplished. With m>2.0, the phenyl content is fully high, but more structural units in which sterically bulky phenyl radicals concentrate on one silicon atom are contained to provide a considerable steric hindrance. As a result, the degree of spatial freedom of organosiloxane molecules is reduced to prevent aromatic rings from fully overlapping each other, which is necessary for the flame retarding mechanism due to mutual coupling of aromatic rings to work, failing to achieve satisfactory flame retardance. A more appropriate value of m is 0.6 to 1.8, and an especially preferred value of m is in the range of 0.8 to 1.8.

The substituents attached to silicon atoms through Si—C bonds may include substituents $R^2$ other than phenyl. Since this substituent is not directly related to flame retardant effect, an increased content thereof brings a contrary result. If present in an appropriate content, $R^2$ sometimes acts to mitigate the steric hindrance of an organosiloxane molecule having a high content of bulky phenyl radicals and improve the degree of spatial freedom, thereby facilitating mutual overlapping of phenyl radicals to enhance the flame retardant effect. The content of $R^2$ within which this desirable effect is expectable, represented by n in formula (1), is up to 0.9, preferably 0 to 0.8. Preferably the ratio of n to the sum of m and n in formula (1), that is, $n/(m+n)$ is from 0 to 0.3. With $n/(m+n)$ in excess of 0.3, the relative content of phenyl radicals is reduced, sometimes failing to achieve a sufficient flame retardant effect.

With respect to the optical transparency of parts molded from the flame retardant resin composition, as the phenyl content of organosiloxane becomes higher, the organopolysiloxane becomes more dispersible in or compatible with the aromatic ring-bearing synthetic resin whereby the optical transparency is improved. The preferred phenyl content, represented by m in formula (1), within which both flame retardance and optical transparency are ensured is from 0.6 to 1.5, and the preferred proportion of substituents other than phenyl, represented by $n/(m+n)$, is from 0 to 0.2.

It is noted that the sum of $m+n+p+q$ is from 0.92 to 2.8. With $m+n+p+q<0.92$, the organopolysiloxane has a too high degree of polymerization (or molecular weight) to provide flame retardance. With $m+n+p+q>2.8$, the organopolysiloxane has a too low degree of polymerization (or molecular weight) to provide flame retardance.

Preferably, the organosiloxane (B) contains at least 50 mol % of units of the following formula (2).

$$R^4\text{—}SiX_3 \quad (2)$$

In formula (2), $R^4$ is as defined for $R^1$ or $R^2$, X is —OH, —$OR^3$ or siloxane residue, and at least one of the three X radicals attached to one silicon atom is a siloxane residue. The siloxane residue is represented by $O_{1/2}$ when one of the X radicals is a siloxane residue, $O_{2/2}$ when two of the X radicals are siloxane residues, and $O_{3/2}$ when the three X radicals are siloxane residues. These oxygen atoms bond with other silicon atoms to form siloxane bonds.

These trifunctional siloxane units form a three-dimensional crosslink structure to strengthen the molecular structure of organosiloxane to impart resinous nature thereto, thereby improving the dispersibility of the organosiloxane in the aromatic ring-bearing synthetic resin (A) and processability. As opposed to an organosiloxane of a linear molecular structure containing more monofunctional or difunctional siloxane units that tends to form a volatile low molecular weight siloxane through the rearrangement of siloxane bonds induced by heat during combustion so that it may escape from the system, an organosiloxane containing more trifunctional siloxane units with high crosslinking reactivity converts to a higher molecular weight one which remains in the system to contribute to flame retardance. If the trifunctional siloxane units are less than 50 mol %, these effects would become lower. Better flame retardant effect is achieved with organosiloxanes containing at least 60 mol %, especially at least 95 mol % of trifunctional siloxane units.

$R^4$ in formula (2) is as defined for $R^1$ or $R^2$, typically alkyl, alkenyl and aryl radicals, which may have substituents other than halogens. Examples of the radical represented by $R^4$ include alkyl radicals such as methyl, ethyl, propyl, butyl and hexyl, alkenyl radicals such as vinyl, propenyl and butenyl, and aryl radicals such as phenyl. Phenyl and methyl are commercially preferred.

X in formula (2) is —OH, —$OR^3$ or siloxane residue, and at least one of the three X radicals attached to one silicon atom must contain a siloxane bond or siloxane residue. The term siloxane residue means that the oxygen atom in a linkage $\equiv$Si—O— bonds with another silicon atom to form a siloxane bond. More illustratively, the siloxane residue is represented by $O_{1/2}$ when one X radical is a siloxane residue, $O_{2/2}$ when two X radicals are siloxane residues, and $O_{3/2}$ when the three X radicals are siloxane residues. These oxygen atoms bond with other silicon atoms to form siloxane bonds. The units of formula (2) are illustrated below.

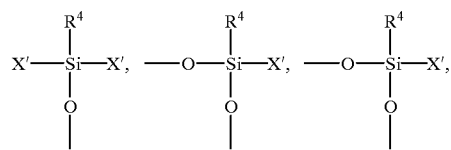

Herein, $R^4$ is as defined above and X' is OH or $OR^3$.

Preferred examples of the trifunctional siloxane unit of formula (2) are given below:

$C_6H_5SiO_{3/2}$,
$C_6H_5Si(OCH_3)O_{2/2}$,
$C_6H_5Si(OH)O_{2/2}$,
$C_6H_5Si(OCH_3)_2O_{1/2}$,
$CH_3SiO_{3/2}$,
$CH_3Si(OCH_3)O_{2/2}$,
$CH_3Si(OH)O_{2/2}$, and
$CH_3Si(OCH_3)_2O_{1/2}$.

Herein, $O_{1/2}$, $O_{2/2}$, and $O_{3/2}$ represent siloxane residues that bond with other silicon atoms to form siloxane bonds as mentioned above.

As constituent units other than the trifunctional siloxane units described above, the organosiloxane (B) may contain the following siloxane units in such amounts as not to affect the physical properties thereof:

difunctional siloxane units represented by $R^5R^6SiX_2$, monofunctional siloxane units represented by $R^7R^8R^9SiO_{1/2}$, and tetrafunctional siloxane units represented by $SiX_4$, wherein $R^5$, $R^6$, $R^7$, $R^8$, and $R^9$ are organic radicals as defined for $R^4$ in formula (2), the organic radicals in the same formula may be the same or different, and X is as defined in formula (2).

Preferred examples of the monofunctional siloxane unit are given below:

$(CH_3)_3SiO_{1/2}$ and
$C_6H_5(CH_3)_2SiO_{1/2}$.

Preferred examples of the difunctional siloxane unit are given below:

$(C_6H_5)_2Si\ O_{2/2}$,
$(C_6H_5)_2Si(OCH_3)O_{1/2}$,
$(C_6H_5)_2Si(OH)O_{1/2}$,
$(CH_3)C_6H_5SiO_{2/2}$,
$(CH_3)C_6H_5Si(OCH_3)O_{1/2}$,
$CH_3)C_6H_5Si(OH)O_{1/2}$, and
$(CH_3)_2SiO_{2/2}$.

Preferred examples of the tetrafunctional siloxane unit are given below:

$SiO_{4/2}$,
$Si(OCH_3)O_{3/2}$,
$Si(OH)O_{3/2}$,
$Si(OCH_3)_2O_{2/2}$,
$Si(OH)_2O_{2/2}$, and
$Si(OCH_3)_3O_{1/2}$.

In particular, the tetrafunctional siloxane units exert a flame retardant effect similar to the trifunctional siloxane units because the tetrafunctional siloxane units form a three-dimensional crosslink structure to strengthen the molecular structure of organosiloxane and their high crosslinking reactivity converts the organosiloxane to a higher molecular weight one which remains in the system to contribute to flame retardance. Also, the inclusion of tetrafunctional siloxane units in organosiloxane imparts inorganic compound-like properties thereto, which is further preferable in view of the flame retardant effect. However, a higher content of tetrafunctional siloxane units reduces the dispersibility in and compatibility with the aromatic ring-bearing synthetic resin (A), thereby detracting from the outer appearance, transparency and strength of molded parts. Therefore, an attention must be paid so as not to increase the content too much. The desired content of tetrafunctional siloxane units is up to 50 mol %.

The organosiloxane (B) preferably has an average degree of polymerization of 2.5 to 20. The degree of polymerization is a crucial factor that governs the flame retardant effect. Organosiloxanes with an average degree of polymerization in this range are well dispersible upon melt mixing, but localized at a relatively high concentration on the surface of molded parts so that the heat during combustion may cause the organosiloxane to melt and migrate to gather in proximity to the combusted site. This ease of migration also facilitates overlapping of phenyl radicals for further improving the flame retardant effect. However, a low molecular weight organosiloxane having an average degree of polymerization of less than 2.5 can be lost through gasification with heat during melt mixing or combustion, with the flame retardant effect being reduced. Organosiloxanes having an average degree of polymerization of more than 20 have the problems that the ease of migration during combustion is lost to reduce the flame retardant effect, and reactive alkoxy and silanol radicals can condense to form an insoluble high molecular weight matter during melt mixing, exacerbating the dispersion of organosiloxane in the aromatic ring-bearing synthetic resin. More preferably, the organosiloxane has an average degree of polymerization of 2.5 to 15. Further desirably, a weight average molecular weight of 410 to less than 2,000 is met.

The organosiloxanes may be prepared by well-known methods. For example, an organochlorosilane capable of forming the above-mentioned siloxane unit is reacted with an alcohol in excess of the necessity to react with all chloro radicals and water to form an alkoxy-bearing organosilane, and the unreacted alcohol, water and hydrogen chloride as the reaction by-product are removed by vacuum stripping or other suitable means, obtaining the end product. In order to prepare an organosiloxane having the desired alkoxy content or average molecular weight, the amounts of alcohol and water to be reacted are adjusted. An organosiloxane approximate to the desired structure can be obtained when water is used in a theoretical amount to achieve the desired average molecular weight and the alcohol used in excess of a theoretical amount to achieve the desired alkoxy content.

If an alkoxysilane capable of forming the above-mentioned siloxane unit is available, a method of effecting partial hydrolytic condensation reaction in the presence of water in a theoretical amount to achieve the desired average molecular weight is possible. In this case, an acid, base or organometallic compound is preferably added as a catalyst for promoting the reaction. The alcohol by-product is removed by distillation under atmospheric pressure or vacuum stripping, yielding the end product. When it is desired to further increase the storage stability, the reaction catalyst added may be removed by neutralization, for example. In any of these methods, an organic solvent may be blended for the purpose of preventing gel formation or restraining a molecular weight distribution from spreading.

The amount of organosiloxane (B) blended in the flame retardant resin composition of the invention is 0.1 to 10 parts, preferably 1 to 8 parts by weight, per 100 parts by weight of the synthetic resin (A). Less than 0.1 part of organosiloxane (B) on this basis is too small to impart flame retardance whereas more than 10 parts of organosiloxane (B) can adversely affect the outer appearance and strength of molding. These organosiloxane does not evolve harmful gases upon combustion.

Better flame retardance is sometimes obtained when organic alkali metal salts, organic alkaline earth metal salts or mixtures thereof such as sodium diphenylsulfone-3-sulfonate and sodium perfluoroalkanesulfonates are added to the flame retardant resin composition of the invention. These salts function as a carbonization accelerator for promoting formation of an incombustible Si—C ceramic layer by mutual coupling of aromatic rings, and any of salts known of such function may be used. An appropriate amount of the salt added is 0.001 to 5 parts by weight per 100 parts by weight of the aromatic ring-bearing synthetic resin (A). Less than 0.001 part of the salt is ineffective for its purpose whereas more than 5 parts of the salt would adversely affect the outer appearance and strength of molding. Illustrative examples are sodium benzenesulfonate, disodium naphthalene-2,6-disulfonate, sodium diphenylsulfone-3-sulfonate, and sodium perfluorobutanesulfonate.

In the flame retardant resin composition of the invention, an inorganic filler may be blended as a reinforcement. Examples of the filler include silicas such as fused silica and crystalline silica, alumina, silicon nitride, aluminum nitride, boron nitride, titanium oxide, and glass fibers. No particular limits are imposed on the mean particle size and shape of the inorganic filler although spherical fused silica having a mean particle size of 5 to 40 μm is especially preferred from the molding and flowing standpoints. An appropriate amount of the inorganic filler is about 400 to about 1,200 parts by weight per 100 parts by weight of the aromatic ring-bearing synthetic resin (A). Less than 400 parts of the filler would be less effective for reinforcement whereas more than 1,200 parts of the filler can adversely affect moldability. In order to enhance the bond strength between the synthetic resin and the inorganic filler, it is preferred to use the inorganic filler which has been surface treated with coupling agents such as silane coupling agents and titanate coupling agents. Exemplary coupling agents include epoxysilanes such as γ-glycidoxypropyltrimethoxysilane, γ-glycidoxypropylmethyldiethoxysilane, and β-(3,4-epoxycyclohexyl)ethyltrimethoxysilane, aminosilanes such as N-β-(aminoethyl)-γ-aminopropyltrimethoxysilane, γ-aminopropyltriethoxysilane, and N-phenyl-γ-aminopropyltrimethoxysilane, and mercaptosilanes such as γ-mercaptopropyltrimethoxysilane. The amount of coupling agent used and the surface treating method are not critical.

In the flame retardant resin composition according to the invention, any of well-known additives may be blended, if necessary, for example, antioxidants, neutralizing agents, UV absorbers, antistatic agents, pigments, dispersants, lubricants, thickeners, drip inhibitors (such as fluoro-resins), stress-reducing agents, waxes, and coloring agents.

In preparing the composition of the invention, the above essential and optional components are metered and mixed using equipment and methods commonly used in the manufacture of prior art rubber and plastic compositions. More particularly, the components are fully mixed and dispersed by an agitating mixer such as a ribbon blender or Henschel mixer, and the mixture is further kneaded in a melt kneader such as a Banbury mixer or extruder, thereby obtaining the desired composition.

In molding the composition of the invention, any of well-known molding methods such as injection molding, extrusion molding, compression molding and vacuum forming may be used.

EXAMPLE

Examples of the invention are given below by way of illustration and not by way of limitation. The organosiloxanes obtained in the following Preparation Examples were examined for structure by $^{29}$Si-NMR and H-NMR and their degree of polymerization was determined by plotting GPC measurement data on a calibration curve obtained from a polystyrene standard sample. Ph is phenyl and Vi is vinyl.

Preparation Example 1

A 1-liter flask equipped with a stirrer, condenser and thermometer was charged with 211 g (1 mol) of phenyltrichlorosilane and 143 g of toluene and heated to an internal temperature of 40° C. in an oil bath. A dropping funnel was charged with 64 g (2 mol) of methanol, which was added dropwise to the flask over one hour with stirring. Alkoxylation reaction was proceeded while removing out of the system hydrogen chloride gas evolving during the reaction. At the end of dropwise addition, stirring was continued at the internal temperature of 40° C. for a further one hour for ripening. The dropping funnel was then charged with 12 g (0.7 mol) of water, which was added dropwise to the flask over one hour with stirring. Hydrolytic condensation reaction was proceeded while removing out of the system hydrogen chloride gas evolving during the reaction. At the end of dropwise addition, stirring was continued at the internal temperature of 40° C. for a further one hour for ripening. Subsequently, the toluene, the excess of methanol, unreacted water, and hydrogen chloride were removed by vacuum distillation, yielding 151 g of a liquid methoxy-bearing organosiloxane.

The resulting organosiloxane is of $$Ph_{1.0}Si(OCH_3)_{1.5}(OH)_{0.2}O_{1.3/2},$$

when represented by the average compositional formula:

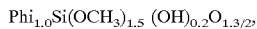

wherein m=1.0, n=0, n/(m+n)=0, the organic substituents attached to silicon atoms through Si—C bonds are 100 mol % phenyl, p=1.5, $R^3$=methyl, q=0.2, and trifunctional siloxane units are contained 100 mol %. The organosiloxane appeared to be a colorless clear liquid and had an average degree of polymerization of 3 and a weight average molecular weight of 500.

Preparation Example 2

The procedure of Preparation Example 1 was repeated except that in the alkoxylation step, the 1-liter flask was charged with 159 g (0.75 mol) of phenyltrichlorosilane, 37 g (0.25 mol) of methyltrichlorosilane, and 143 g of toluene, and the dropping funnel was charged with 48 g (1.5 mol) of methanol, and in the subsequent hydrolytic condensation step, the dropping funnel was charged with 18 g (1 mol) of water. There was obtained 120 g of a liquid methoxy-bearing organosiloxane.

The resulting organosiloxane is of $$Ph_{0.75}(CH_3)_{0.25}Si(OCH_3)_{1.0}(OH)_{0.17}O_{1.83/2},$$

when represented by the average compositional formula:

wherein m=0.75, n=0.25, n/(m+n)=0.25, the organic substituents attached to silicon atoms through Si—C bonds are 75 mol % phenyl and 25 mol % methyl, p=1.0, $R^3$= methyl, q=0.17, and trifunctional siloxane units are contained 100 mol %. The organosiloxane appeared to be a colorless clear liquid and had an average degree of polymerization of 14 and a weight average molecular weight of 1,900.

Preparation Example 3

The procedure of Preparation Example 1 was repeated except that in the alkoxylation step, the 1-liter flask was charged with 159 g (0.75 mol) of phenyltrichlorosilane, 37 g (0.25 mol) of vinyltrichlorosilane, and 143 g of toluene, and the dropping funnel was charged with 48 g (1.5 mol) of methanol, and in the subsequent hydrolytic condensation step, the dropping funnel was charged with 17 g (0.9 mol) of water. There was obtained 120 g of a liquid methoxy-bearing organosiloxane.

The resulting organosiloxane is of $$Ph_{0.7}Vi_{0.25}Si(OCH_3)_{1.0}(OH)_{0.17}O_{1.83/2},$$

when represented by the average compositional formula:

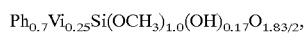

wherein m=0.75, n=0.25, n/(m+n)=0.25, the organic substituents attached to silicon atoms through Si—C bonds are 75 mol % phenyl and 25 mol % vinyl, p=1.0, $R^3$=methyl, q=0.17, and trifunctional siloxane units are contained 100 mol %. The organosiloxane appeared to be a colorless clear liquid and had an average degree of polymerization of 10 and a weight average molecular weight of 1,500.

Preparation Example 4

The procedure of Preparation Example 1 was repeated except that in the alkoxylation step, the 1-liter flask was charged with 180 g (0.85 mol) of phenyltrichlorosilane, 19 g (0.15 mol) of dimethyldichlorosilane, and 143 g of toluene, and the dropping funnel was charged with 48 g (1.5 mol) of methanol, and in the subsequent hydrolytic condensation step, the dropping funnel was charged with 18 g (1 mol) of water. There was obtained 130 g of a liquid methoxy-bearing organosiloxane.

The resulting organosiloxane is of $$Ph_{0.85}(CH_3)_{0.3}Si(OCH_3)_{0.9}(OH)_{0.16}O_{1.79/2},$$

when represented by the average compositional formula:

wherein m=0.85, n=0.3, n/(m+n)=0.26, the organic substituents attached to silicon atoms through Si—C bonds are 74 mol % phenyl and 26 mol % methyl, p=0.9, $R^3$=methyl, q=0.16, and trifunctional siloxane units are contained 85 mol %. The organosiloxane appeared to be a colorless clear liquid and had an average degree of polymerization of 9 and a weight average molecular weight of 1,300.

Preparation Example 5

The procedure of Preparation Example 1 was repeated except that in the alkoxylation step, the 1-liter flask was charged with 148 g (0.6 mol) of phenyltrichlorosilane and 101 g (0.4 mol) of diphenyldichlorosilane, and the dropping funnel was charged with 32 g (1.0 mol) of methanol, and in the subsequent hydrolytic condensation step, the dropping funnel was charged with 20 g (1.1 mol) of water. There was obtained 116 g of a liquid organosiloxane.

The resulting organosiloxane is of $$Ph_{1.4}Si(OCH_3)_{0.6}(OH)_{0.16}O_{1.84/2},$$

when represented by the average compositional formula:

$$R^1{}_mR^2{}_nSi(OR^3)_p(OH)_qO_{(4-m-n-p-q)/2}$$

wherein m=1.4, n=0, n/(m+n)=0, the organic substituents attached to silicon atoms through Si—C bonds are 100 mol % phenyl, p=0.6, $R^3$=methyl, q=0.16, and trifunctional siloxane units are contained 60 mol %. The organosiloxane appeared to be a colorless clear liquid and had an average degree of polymerization of 10 and a weight average molecular weight of 1,700.

Preparation Example 6

A 1-liter flask equipped with a stirrer, condenser and thermometer was charged with 132 g (0.55 mol) of phenyltriethoxysilane, 94 g (0.45 mol) of tetraethoxysilane, and 64 g of ethanol and heated to an internal temperature of 40° C. in an oil bath. A dropping funnel was charged with 9 g of 30% aqueous hydrochloric acid (water 0.35 mol), which was added dropwise to the flask over one hour with stirring for reaction to take place. At the end of dropwise addition, stirring was continued at an internal temperature of 67° C. for a further one hour for ripening. The ethanol and unreacted water were distilled off under atmospheric pressure while the reaction solution was heated to 100° C. Thereafter, hydrogen chloride was removed by vacuum distillation, yielding 170 g of a liquid ethoxy-bearing organosiloxane.

The resulting organosiloxane is of $$Ph_{0.55}Si(OC_2H_5)_{2.2}(OH)_{0.05}O_{1.2/2},$$

when represented by the average compositional formula:

$$R^1{}_mR^2{}_nSi(OR^3)_p(OH)_qO_{(4-m-n-p-q)/2}$$

wherein m=0.55, n=0, n/(m+n)=0, the organic substituents attached to silicon atoms through Si—C bonds are 100 mol % phenyl, p=2.2, $R^3$=ethyl, q=0.05, and trifunctional siloxane units are contained 55 mol %. The organosiloxane appeared to be a colorless clear liquid and had an average degree of polymerization of 2.5 and a weight average molecular weight of 470.

Preparation Example 7

The procedure of Preparation Example 6 was repeated except that the 1-liter flask was charged with 85 g (0.4 mol) of phenyltrimethoxysilane, 91 g (0.6 mol) of tetramethoxysilane, and 64 g of methanol, and the dropping funnel was charged with 16 g of 30% aqueous hydrochloric acid (water 0.6 mol). There was obtained 125 g of a methoxy-bearing organosiloxane.

The resulting organosiloxane is of $$Ph_{0.4}Si(OCH_3)_{2.6}(OH)_{0.1}O_{0.9/2},$$

when represented by the average compositional formula:

$$R^1{}_mR^2{}_nSi(OR^3)_p(OH)_qO_{(4-m-n-p-q)/2}$$

wherein m=0.4, n=0, n/(m+n)=0, the organic substituents attached to silicon atoms through Si—C bonds are 100 mol % phenyl, p=2.6, $R^3$=methyl, q=0.1, and trifunctional siloxane units are contained 40 mol %. The organosiloxane appeared to be a colorless clear liquid and had an average degree of polymerization of 2 and a weight average molecular weight of 300.

Preparation Example 8

The procedure of Preparation Example 1 was repeated except that in the alkoxylation step, the 1-liter flask was charged with 177 g (0.7 mol) of diphenyldichlorosilane and 88 g (0.3 mol) of triphenylchlorosilane, and the dropping funnel was charged with 32 g (1.0 mol) of methanol, and in the subsequent hydrolytic condensation step, the dropping funnel was charged with 9 g (0.5 mol) of water. There was obtained 211 g of a methoxy-bearing organosiloxane.

The resulting organosiloxane is of $$Ph_{2.3}Si(OCH_3)_{0.7}(OH)_{0.1}O_{0.9/2},$$

when represented by the average compositional formula:

$$R^1{}_mR^2{}_nSi(OR^3)_p(OH)_qO_{(4-m-n-p-q)/2}$$

wherein m=2.3, n=0, n/(m+n)=0, the organic substituents attached to silicon atoms through Si—C bonds are 100 mol % phenyl, p=0.7, $R^3$=methyl, q=0.1, and trifunctional siloxane units are contained 0 mol %. The organosiloxane appeared to be a colorless clear liquid and had an average degree of polymerization of 2 and a weight average molecular weight of 470.

Preparation Example 9

The procedure of Preparation Example 6 was repeated except that the 1-liter flask was charged with 198 g (1 mol) of phenyltrimethoxysilane and 64 g of methanol, and the dropping funnel was charged with 31 g of 13% aqueous hydrochloric acid (water 1.5 mol). There was obtained 115 g of a methoxy-bearing organosiloxane.

The resulting organosiloxane is of $$Ph_{1.0}Si(OCH_3)_{0.1}(OH)_{0.3}O_{2.6/2},$$

when represented by the average compositional formula:

$$R^1{}_mR^2{}_nSi(OR^3)_p(OH)_qO_{(4-m-n-p-q)/2}$$

wherein m=1.0, n=0, n/(m+n)=0, the organic substituents attached to silicon atoms through Si—C bonds are 100 mol % phenyl, p=0.1, $R^3$=methyl, q=0.3, and trifunctional siloxane units are contained 100 mol %. The organosiloxane appeared to be a colorless clear solid and had an average degree of polymerization of 25 and a weight average molecular weight of 3,300.

Preparation Example 10

The procedure of Preparation Example 1 was repeated except that in the alkoxylation step, the 1-liter flask was charged with 95 g (0.45 mol) of phenyltrichlorosilane and 71 g (0.55 mol) of dimethyldichlorosilane, and the dropping funnel was charged with 48 g (1.5 mol) of methanol, and in the subsequent hydrolytic condensation step, the dropping funnel was charged with 18 g (1 mol) of water. There was obtained 100 g of a liquid organosiloxane.

The resulting organosiloxane is of $$Ph_{0.45}(CH_3)_{1.1}Si(OCH_3)_{0.5}(OH)_{0.2}O_{1.75/2},$$

when represented by the average compositional formula:

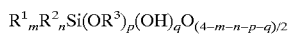

wherein m=0.45, n=1.1, n/(m+n)=0.7, the organic substituents attached to silicon atoms through Si—C bonds are 29 mol % phenyl and 71 mol % methyl, p=0.5, R³=methyl, q=0.2, and trifunctional siloxane units are contained 45 mol %. The organosiloxane appeared to be a colorless clear liquid and had an average degree of polymerization of 10 and a weight average molecular weight of 1,100.

Examples 1–8 & Comparative Examples 1–7

Compositions were prepared by adding 1 part of an organosiloxane to 100 parts by weight of an aromatic polycarbonate resin or 10 parts by weight of an organosiloxane to 100 parts by weight of an aromatic epoxy resin in accordance with the combination shown in Table 1, premixing the ingredients in an automatic mortar, and melt kneading the premix in a single screw extruder at a temperature of 280° C. In Comparative Example 5, KR-219 (silicone resin manufactured by Shin-Etsu Chemical Co., Ltd.; in formula (1), m=0.75 and n=1.0 wherein R² is a mixture of vinyl and methyl) was used.

In Examples 4–7 and Comparative Examples 1 and 5, 0.5 part by weight of sodium diphenylsulfone-3-sulfonate was further added to the mixture.

The polycarbonate resin used was Calibre® 200-20 having a viscosity average molecular weight of about 20,000 commercially available from Sumitomo-Dow K.K. The epoxy resin used was YX4000HK having an epoxy equivalent of 190 commercially available from Yuka Shell K.K. plus an equal weight of a phenolic resin curing agent XL-225-3L having a phenol equivalent of 168 commercially available from Mitsui Toatsu Chemical K.K.

The compositions were examined for flame retardance and optical transparency.

Test bars of 1/16 inch thick were molded from the compositions and examined for flame retardance in accordance with the test procedure set forth in Underwriters' Laboratories, Inc. Bulletin 94, Burning test for Classifying Materials (hereinafter referred to as UL-94).

The optical transparency was measured by means of a visible absorption spectrophotometer. Using a molded plate of 10 mm thick, a visible light transmittance across a light path length of 10 mm in the thickness direction was measured. The transmittance of a sample was divided by the transmittance of a control sample free of organosiloxane, giving a percent transmittance. Samples were rated "Pass" when the percent transmittance was 70% or higher and "Reject" when the percent transmittance was less than 70%.

The results are shown in Table 1.

TABLE 1

| | Synthetic Resin | Organosiloxane | Transmittance | UL-94 rating |
|---|---|---|---|---|
| E1 | Polycarbonate | 1 | Pass | V-0 |
| E2 | Polycarbonate | 2 | Pass | V-0 |
| E3 | Polycarbonate | 3 | Pass | V-0 |
| E4 | Polycarbonate | 4 | Pass | V-0 |
| E5 | Polycarbonate | 5 | Pass | V-0 |
| E6 | Polycarbonate | 6 | Pass | V-0 |
| E7 | Polycarbonate | 1 | Pass | V-0 |
| E8 | Epoxy | 1 | Pass | V-0 |
| CE1 | Polycarbonate | 7 | Reject | V-2 |
| CE2 | Polycarbonate | 8 | Pass | V-1 |

TABLE 1-continued

| | Synthetic Resin | Organosiloxane | Transmittance | UL-94 rating |
|---|---|---|---|---|
| CE3 | Polycarbonate | 9 | Pass | V-1 |
| CE4 | Polycarbonate | 10 | Reject | V-2 |
| CE5 | Polycarbonate | KR-219 | Pass | V-1 |
| CE6 | Polycarbonate | none | Pass | burned |
| CE7 | Epoxy | none | Reject | burned |

Note that the organosiloxane was identified by its Preparation Example No.

The resin composition comprising an aromatic ring-bearing synthetic resin and an organosiloxane containing phenyl and alkoxy radicals is rendered flame retardant in that it does not evolve harmful gases when burned, while parts molded therefrom maintain optical transparency.

Japanese Patent Application No. 335153/1997 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:
1. A flame retardant resin composition comprising
(A) 100 parts by weight of a synthetic resin containing an aromatic ring in a molecule, and
(B) 0.1 to 10 parts by weight of an organosiloxane containing phenyl and alkoxy radicals, represented by the following average compositional formula (1):

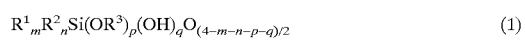 (1)

wherein R¹ is phenyl, R² is a monovalent hydrocarbon radical of 1 to 6 carbon atoms excluding phenyl, R³ is a monovalent hydrocarbon radical of 1 to 4 carbon atoms, and letters m, n, p and q are numbers satisfying 0.5≦m≦2.0, 0≦n≦0.9, 0.42≦p≦2.5, 0≦q≦0.35, and 0.92≦m+n+p+q≦2.8, said organosiloxane (B) containing at least 50 mol % of units of formula (2):

 (2)

wherein R⁴ is as defined for R¹ or R², X is —OH, —OR³ or siloxane residue, at least one of the three X radicals attached to one silicon atom is a siloxane residue, said siloxane residue is represented by O$_{1/2}$, O$_{2/2}$, and O$_{3/2}$ when one, two and three of the X radicals are siloxane residues, respectively and these oxygen atoms bond with other silicon atoms to form siloxane bonds.

2. The composition of claim 1 wherein the organosiloxane (B) has a weight average molecular weight of 410 to less than 2,000.

3. The composition of claim 1 wherein in formula (1), m and n further satisfy 0≦n/(m+n)≦0.3.

4. The composition of claim 1 wherein in formula (1), R² is methyl.

5. The composition of claim 1 wherein component (A) is an aromatic polycarbonate resin or aromatic epoxy resin.

6. The composition of claim 1, wherein component (A) is a polyphenylene oxide resin, an acrylonitrile-butadiene-styrene resin, an acrylonitrile-styrene resin, an aromatic epoxy resin, or an aromatic polyester resin.

7. The composition of claim 5, wherein the aromatic epoxy resin has at least two curable epoxy groups in a molecule.

8. The composition of claim 5, wherein the aromatic epoxy resin is a novolak epoxy resin, a triphenolalkane epoxy resin, a dicyclopentadiene-phenol novolak resin, a phenolaralkyl epoxy resin, a glycidyl ester epoxy resin, an alicyclic epoxy resin or a heterocyclic epoxy resin.

9. The composition of claim 1, wherein $R^2$ is $C_{1-6}$-alkyl or $C_{2-6}$-alkenyl.

10. The composition of claim 1, wherein $R^3$ is $C_{1-4}$-alkyl.

11. The composition of claim 1, wherein p is 0.45 to 2.3.

12. The composition of claim 1, wherein q is $\leq 0.30$.

13. The composition of claim 1, wherein m is 0.6 to 1.8.

14. The composition of claim 1, wherein m is 0.6 to 1.5.

15. The composition of claim 1, wherein n is 0 to 0.8.

16. The composition of claim 1, wherein (B) contains at least 60 mol % of units of formula (2).

17. The composition of claim 1, wherein (B) contains at least 95 mol % of units of formula (2).

18. The composition of claim 1, wherein $R^4$ is alkyl, alkenyl or aryl, optionally substituted with substituents other than halogen.

19. The composition of claim 1, wherein $R^4$ is phenyl or methyl.

20. The composition of claim 1, wherein formula (2) is $C_6H_5SiO_{3/2}$, $C_6H_5Si(OCH_3)O_{2/2}$, $C_6H_5Si(OH)O_{2/2}$, $C_6H_5Si(OCH_3)_2O_{1/2}$, $CH_3SiO_{3/2}$, $CH_3Si(OCH_3)O_{2/2}$, or $CH_3Si(OH)O_{2/2}$, $CH_3Si(OCH_3)_2O_{1/2}$.

21. The composition of claim 1, further comprising difunctional siloxane units represented by $R^5R^6SiX_2$, monofunctional siloxane units represented by $R^7R^8R^9SiO_{1/2}$, or tetrafunctional siloxane units represented by $SiX_4$, wherein $R^5$, $R^6$, $R^7$, $R^8$ and $R^9$ are each independently as defined for $R^4$ in formula (2), and X is as defined in formula (2).

22. The composition of claim 1, further comprising tetrafunctional siloxanes of the formulae $SiO_{4/2}$, $Si(OCH_3)O_{3/2}$, $Si(OH)O_{3/2}$, $Si(OCH_3)_2O_{2/2}$, $Si(OH)_2O_{2/2}$, or $Si(OCH_3)_3O_{1/2}$.

23. The composition of claim 1, wherein organosiloxane (B) has an average degree of polymerization of 2.5 to 20.

24. The composition of claim 1, further comprising organic alkali metal salts, organic alkaline earth metal salts or mixtures thereof.

* * * * *